United States Patent
Qu et al.

(10) Patent No.: US 8,207,087 B2
(45) Date of Patent: Jun. 26, 2012

(54) METHOD FOR MAKING FERRIC AND MANGANESE BINARY OXIDE BASED ADSORBENT

(75) Inventors: Jiuhui Qu, Beijing (CN); Huijuan Liu, Beijing (CN); Pengju Lei, Beijing (CN); Gaosheng Zhang, Beijing (CN); Ruiping Liu, Beijing (CN); Fangfang Chang, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 317 days.

(21) Appl. No.: 12/668,971

(22) PCT Filed: Jul. 13, 2007

(86) PCT No.: PCT/CN2007/070291
§ 371 (c)(1),
(2), (4) Date: Jan. 13, 2010

(87) PCT Pub. No.: WO2009/009942
PCT Pub. Date: Jan. 22, 2009

(65) Prior Publication Data
US 2010/0181258 A1    Jul. 22, 2010

(51) Int. Cl.
*B01J 21/04*    (2006.01)

(52) U.S. Cl. .......... 502/439; 502/406; 502/526
(58) Field of Classification Search ............ 502/439, 502/406, 514, 526
See application file for complete search history.

(56) References Cited

U.S. PATENT DOCUMENTS 5,770,093 A    6/1998    Shiota et al.

FOREIGN PATENT DOCUMENTS

| | | |
|---|---|---|
| CN | 1500737 | 6/2004 |
| CN | 1864851 | 11/2006 |
| CN | 101024160 | 8/2007 |
| FR | 2859634 | 3/2005 |
| GB | 2397299 | 7/2004 |
| JP | 2004255376 | 9/2004 |
| WO | 2007047624 | 4/2007 |

*Primary Examiner* — Edward Johnson
(74) *Attorney, Agent, or Firm* — Volpe and Koenig P.C.

(57) ABSTRACT

The present invention relates to a ferric and manganese binary oxide (FMBO) based adsorbent, its preparation and application method. The FMBO based adsorbent comprises a ferric and manganese binary oxide (FMBO) and a carrier. The mass ratio of FMBO to the carrier is between 0.2:100 and 15:100. The FMBO based adsorbent effectively removes the arsenic in groundwater, particularly the arsenite. The present invention also provides the equipment for preparation and application of the adsorbent.

5 Claims, 1 Drawing Sheet

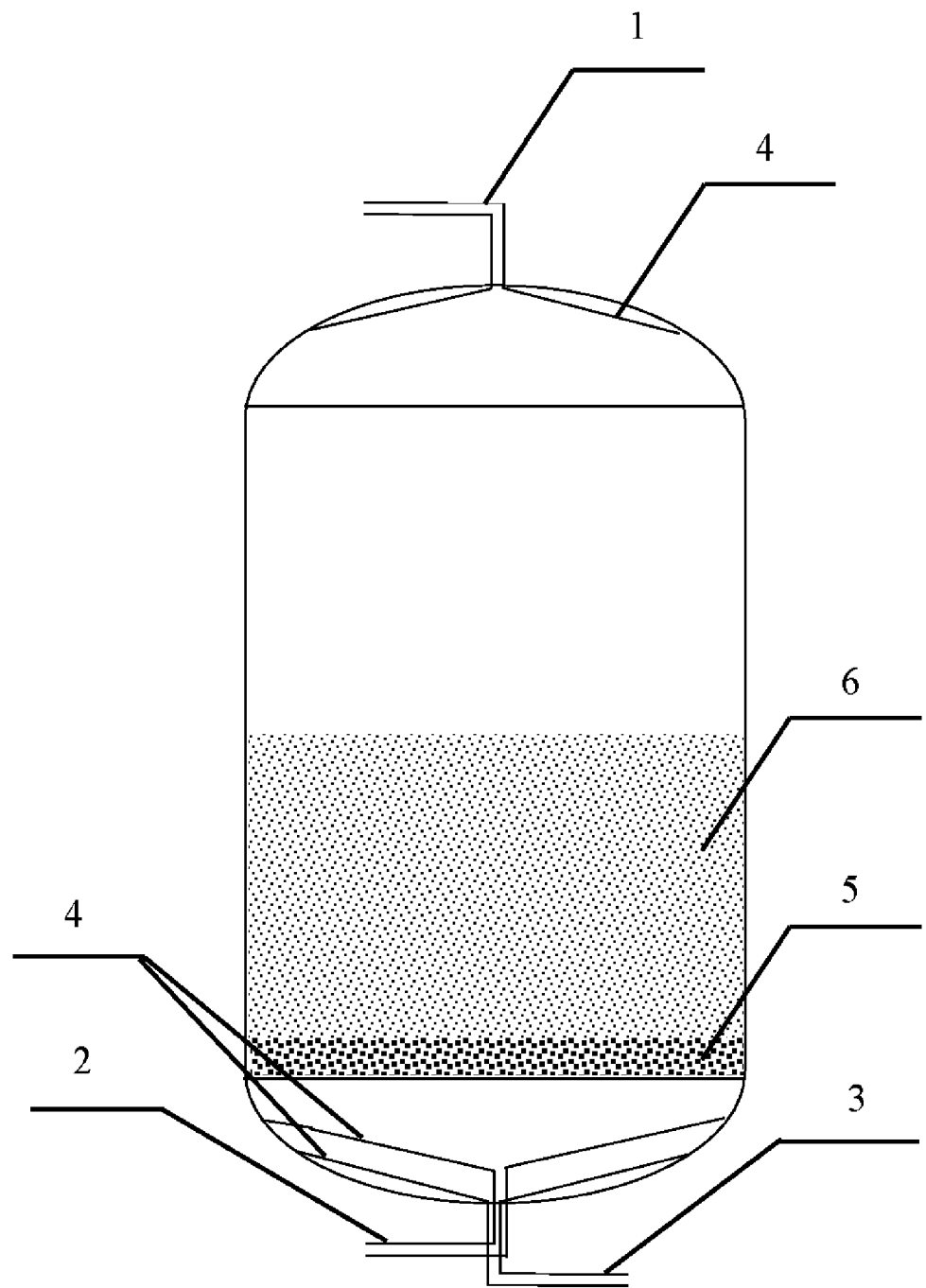
图 1

METHOD FOR MAKING FERRIC AND MANGANESE BINARY OXIDE BASED ADSORBENT

THE FIELD OF THE INVENTION

The present invention relates to a ferric and manganese binary oxide (FMBO) based adsorbent, a method for the preparation of the adsorbent, and a method for the application of the adsorbent.

BACKGROUND OF THE INVENTION

Arsenic is widely distributed in natural water environment. Arsenic normally exists as arsenate (As(V)) in surface water bodies. However, under reductive conditions such as underground water, the dominant species of arsenic is arsenite (As(III)). Arsenic has been reported to show acute and chronic toxicity to human beings, and the long term exposure to arsenic via drinking water has serious effects on the health of human beings.

The technologies for the removal of arsenic from drinking water receive great concern from researchers from all over the world. There are several technologies, i.e., coagulation, precipitation and/or co-precipitation, adsorption, membrane filtration, ion exchange, that have been demonstrated to be feasible. Coagulation is normally adapted in municipal drinking water treatment plants. Membrane filtration may be automatically controlled, but could not achieve satisfied removal of arsenic unless the reverse osmosis (RO) is used. The high cost and the simultaneous removal of large scale co-existent ions during the removal of arsenic also preclude the implementation of RO in practice. As for the ion exchange method, the operation is complicated and the cost is very high. Adsorption shows several advantages such as low cost, simple operation, and high effectiveness, and is viewed as one of the best methods for the removal of arsenic from drinking water in small systems, especially in rural areas.

Adsorption uses insoluble adsorbents with high specific surface areas and fine mechanic strength to facilitate the adsorption of arsenic onto the surfaces of adsorbents, through physical adsorption, chemical adsorption, and/or ion exchange, so as to achieve the removal of arsenic from water. Adsorption is easy to handle, and is especially suitable to the treatment of arsenic-polluted drinking water with relatively large amount and with low arsenic concentrations.

There has reported several common adsorbents of natural coral, bentonite, zeolite, red mud, coconut shell, coated granule, activated aluminum oxides, activated carbon, and natural or synthetic metal oxides and hydroxides. Many adsorbents show good removal capability towards As(V), but limited removal capability towards As(III). The toxicity of As(III) is more than 60 times to that of As(V), and the removal of As(III) is much more difficult than that of As(V). Consequently, the oxidation of As(III) to As(V) by oxidants, which is followed by the adsorption of As(V) onto adsorbents, is often employed in the treatment of arsenic from drinking water. However, the addition of oxidants would inevitably result in the formation of by-products that shows potential side effects to health of human beings, and the use of chemical oxidants should be avoided or minimized in drinking water treatment processes. Additionally, as for the commonly-used adsorbents, those with low cost generally exhibit low adsorbing capability towards arsenic, and the prices of those with high adsorbing capability are often much too high to inhibit its large scale application in practice. Furthermore, the conventional adsorbents are often produced by the coating of components with adsorptive activities onto porous carriers through the procedures such as soaking, precipitation, and sintering. Unfortunately, the amount of active components would inevitably decrease in the long term operation of adsorption units due to collision and friction between adsorbent particles. The complicated regeneration procedures including soaking, precipitation, and sintering again, are required to retrieve the adsorption activity, which highly precludes its application in engineering. Consequently, it is difficult to develop novel adsorbents with advantages of economical efficiency, easy-to-handle, easy-to-regeneration, and high effectiveness towards both As(III) and As(V).

The present invention relates to a ferric and manganese binary oxide (FMBO) based adsorbent, and the technological principle of removing arsenic includes: 1) during the preparation of the adsorbent, the manganese oxides (Mn(IV) oxides) with oxidative capability and the iron oxides with adsorptive capability are precipitated and in situ coated on the surfaces of porous carriers through the in situ coating procedures; 2) during the adsorption of arsenic, the Mn(IV) oxides contributes to the transformation of As(III) to As(V) through catalytic oxidation effects, and the reductive dissolution of Mn(IV) oxides to Mn(II) increases the adsorptive sites (i.e., surface hydroxyl) and significantly enhances the capability of removing arsenic; 3) during the regeneration of the adsorbent with adsorbed arsenic on its surfaces, the active component is in situ coated onto the surfaces with another layer of FMBO covering the surfaces, and the adsorbed arsenic is solidified in the adsorbent to simplify the regeneration procedures and to avoid the production of high-arsenic wastewater during regeneration. The present invention overcomes many disadvantages stated above, and may simultaneously remove As(III) and As(V) from drinking water to meet the MCLs level of arsenic being lower than $10\,\mu g \cdot L^{-1}$, as being required by the World Health Organization, U.S. Environmental Agency (U.S.EPA), and the National Drinking Water Standard of China No. GB5749-2006.

DISCLOSURE OF THE PRESENT INVENTION

The present invention focuses on arsenic in drinking water, especially the As(III) that is commonly presented in the underground water, and proposes a novel adsorbent with high adsorbing capability and good economical efficiency, and the methods for adsorbents preparation that is easy to apply in engineering.

The technological strategy of the present invention includes:

The present invention provides a ferric and manganese binary oxides (FMBO) based adsorbent, which comprises a ferric and manganese binary oxide (FMBO) and a carrier. The ratio by mass of FMBO to the carrier is from 0.2:100 to 15:100.

The carrier stated above may be selected from diatomite, quartz sand, porcelain granule, manganese grain, anthracite, and magnetite.

The FMBO may be an bimetal oxides composite which is formed through chemical interactions between ferric oxides (i.e., $Fe_2O_3 \cdot xH_2O$, FeOOH) and manganese oxides (i.e., $MnO_2 \cdot yH_2O$, $MnO(OH)_2$). x and y each are integer from 1 to 10, preferably from 2 to 8.

The present invention also provides the process for the preparation of the ferric and manganese binary oxides (FMBO) based adsorbent, which includes the following steps:

(1) separately preparing a solution of a ferrous (Fe(II)) salt and a solution of a permanganate salt; and (2) mixing the solution of the ferrous salt prepared in Step (1) with the carrier, and then adding the solution of the permanganate salt; or, mixing the solution of the permanganate salt prepared in Step (1) with the carrier, and then adding the solution of the ferrous salt; wherein the mol ratio of ferric to manganese in the resulting mixture is (1-5):(5-1).

Preferably, the solution of ferrous (Fe(II)) salt as stated above may further include one or more of ferric (Fe(III)) salts, and manganese (Mn(II)) salts at any ratio by mass; and the manganese (Mn(II)) salts may include one or more of manganese chloride ($MnCl_2$), and manganese sulfate ($MnSO_4$) at any ratio by mass.

Preferably, the solution of permanganate salt as stated above may further include ferric (Fe(III)) salts at any ratio by mass.

The present invention also provides a water purifying reactor for the removal of arsenic by the ferric and manganese binary oxides (FMBO) based adsorbent. The water purifying reactor in the present invention is the conventional adsorption column reactor, except that an inlet is additionally installed in the bottom of the reactor for the addition of the solutions of ferrous (Fe(II)) salts and permanganate salts.

The present invention also provides a method for the in situ preparation of the ferric and manganese binary oxides (FMBO) based adsorbent in the water purifying reactor sated above. First, the ferric and manganese binary oxides (FMBO) based adsorbent or the carriers are filled in the reactor stated above; second, the solution of ferrous salts is pumped into the reactor and then the solution of permanganate salts is pumped into the reactor, or the solution of ferrous salts is pumped into the reactor and then the solution of ferrous salts is pumped into. The solutions of ferrous salts and permanganate salts are both pumped into the reactor through the inlet in the bottom of the reactor as stated above.

Preferably, in the in situ preparation process, the second solution may be pumped into the reactor after the ferric and manganese binary oxides (FMBO) based adsorbent or the carrier is immersed by the first solution for 10 to 60 minutes and the first solution is discharged.

The present invention also provides a method for the application of the ferric and manganese binary oxides (FMBO) based adsorbent for the removal of arsenic from drinking water as follows: the ferric and manganese binary oxides (FMBO) based adsorbent is filled in or in situ prepared in the water purifying reactor, and then the water to be treated flows through the reactor from inlet to outlet of the water purifying reactor.

The present invention may achieve the following technical effects:

As for the adsorbent according to the present invention, the filtration medium (i.e., diatomite, quartz sand, porcelain granule, manganese grain, anthracite, and magnetite) with fine mechanic strength and moderate particle diameters, which is commonly used in drinking water treatment, is adopted as the carrier, and the ferric and manganese binary oxide is used as the active component for arsenic adsorption. The adsorbent according to the present invention shows excellent activities of both oxidation and adsorption, and exhibits outstanding capability of removing both As(III) and As(V) even without the addition of oxidants. The capability of catalytic oxidation and adsorption may be easily recovered by simple regeneration procedures, in the cases of the poisoning or detaching of active component in the long term operation of adsorbents.

1. The preparation and application of the ferric and manganese binary oxide based adsorbent may be realized in the same reactor, with simple operational procedures and low costs.
2. The preparation and regeneration of the ferric and manganese binary oxide based adsorbent is achieved by the in situ coating method. This technical strategy effectively maintains the abundant activated functional groups on the surfaces of the adsorbent, and avoids the deactivation of active functional groups during sintering, and the decrease of surface areas due to particles agglomeration.
3. The adsorption of arsenic by the ferric and manganese binary oxide based adsorbent includes different mechanisms such as oxidation, adsorption, and surface complexion, and the excellent capability of removing both As(III) and As(V) is achieved without the addition of oxidants.
4. The filtration medium with fine mechanic strength and moderate particle diameters, which is commonly used in drinking water treatment, is adopted as the carrier of the adsorbent. The carriers are cost-effective and show satisfactory performance during preparation and application of adsorbents.
5. The preparation and regeneration of the adsorbents are achieved by the in situ coating method, which is easy to handle and highly efficient.

BRIEF DESCRIPTION OF THE DRAWINGS

FIG. 1 shows the water purifying reactor according to the invention.

REFERENCE SIGNS

1. Inlet of arsenic-polluted water that to be treated
2. Outlet of treated water;
3. Inlet of the solutions of ferrous salt or permanganate salt
4. Evenly-distributing equipments
5. Supporting layer with gravel
6. Adsorbing layer with adsorbents or carriers

DETAILED DESCRIPTION

Example 1

Preparation of the FMBO-Based Adsorbent

Diatomite was chosen as the carrier and was filled in the column-type water purifying reactor. The stock solutions of ferrous sulfate (15 g/L of $FeSO_4.7H_2O$) and potassium permanganate (4 g/L of $KMnO_4$) were separately prepared. The pH of potassium permanganate solution was adjusted to in the range from 9 to 11 with sodium hydroxide solution. The solution of ferrous sulfate was continuously pumped into the water purifying reactor as shown in FIG. 1 until the layer of carrier was completely immersed; after immersing for 15 minutes, the solution of ferrous sulfate was discharged through the outlet 2. Then, the potassium permanganate solution into which the sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 15:100.

Application for Water Purification.

As for the raw water to be treated, the turbidity was 1.2 NTU, and the arsenic concentration was 100 μg/L with the ratio by mass of As(III) to As(V) of 3:1. The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 2

Preparation of the FMBO-Based Adsorbent

Diatomite was chosen as the carrier and was filled in the water purifying reactor. The mixed stock solution of ferrous sulfate (8 g/L of $FeSO_4.7H_2O$) and ferric chloride (10 g/L $FeCl_3.6H_2O$) and the stock solution of potassium permanganate (2 g/L of $KMnO_4$) were separately prepared. The pH of potassium permanganate solution was adjusted to in the range from 9 to 11 with sodium hydroxide solution. The solution of ferrous sulfate and ferric chloride was continuously pumped into the water purifying reactor as shown in FIG. 1 until the layer of carrier was completely immersed; after immersing for 30 minutes, the solution was discharged through the outlet 2. Then, the potassium permanganate solution into which sodium hydroxide solution has been added was continuously pumped into the water purifying reactor until the complete immersion of the carrier; after immersing for 30 minutes, the residual solution was discharged from the reactor. The procedures stated above were repeated for 3 times at intervals of 30 minutes. Then, the clean water was pumped into and slowly flowed through the water purifying reactor until the concentrations of Fe and Mn were below the MCLs levels of the drinking water standard. At this time, the ratio by mass of FMBO to carrier was 12:100.

Application for Water Purification.

As for the raw water to be treated, the turbidity was 5.0 NTU, and the arsenic concentration was 100 μg/L with the ratio by mass of As(III) to As(V) of 3:1. First, the raw water was treated with sand filter and the flowing rate was controlled to be 10 m/h. The turbidity was decreased to 1.5 NTU. Then, the effluent from sand filter was pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 3

Preparation of the FMBO-Based Adsorbent

Diatomite was chosen as the carrier and was filled in the water purifying reactor. The mixed stock solution of ferrous sulfate (5 g/L of $FeSO_4.7H_2O$) and ferric chloride (10 g/L $FeCl_3.6H_2O$) and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and ferric chloride was continuously pumped into the water purifying reactor as shown in FIG. 1 until the layer of carrier was completely immersed; after immersing for 15 minutes, the solution was discharged through the outlet 2. Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 14:100 (m/m).

Application for Water Purification.

As for the raw water to be treated, the turbidity was 1.2 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 4

Preparation of the FMBO-Based Adsorbent

Diatomite was chosen as the carrier and was filled in the water purifying reactor. The stock solution of ferrous sulfate (5 g/L of $FeSO_4.7H_2O$), and the mixed stock solution of potassium permanganate (4 g/L of $KMnO_4$) and ferric chloride (10 g/L $FeCl_3.6H_2O$) were separately prepared. The solution of ferrous sulfate was continuously pumped into the water purifying reactor as shown in FIG. 1 until the layer of carrier was completely immersed; after immersing for 15 minutes, the solution was discharged through the outlet 2. Then, the solution of permanganate and ferric chloride was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 14:100.

Application for Water Purification.

As for the raw water to be treated, the turbidity was 1.2 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 5

Preparation of the FMBO-Based Adsorbent

Diatomite was chosen as the carrier and was filled in the water purifying reactor. The mixed stock solution of ferrous sulfate (15 g/L of $FeSO_4.7H_2O$) and ferric chloride (4 g/L $FeCl_3.6H_2O$), and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and ferric chloride was continuously pumped into the water purifying reactor as shown in FIG. 1 until the layer of carrier was completely immersed; after immersing for 15 minutes, the solution was discharged through the outlet 2. Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 15:100.

Application for Water Purification.

As for the raw water to be treated, the turbidity was 1.2 NTU, and the arsenic concentration was 100 μg/L with the ratio by mass of As(III) to As(V) of 3:1. The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 6

Preparation of the FMBO-Based Adsorbent

Diatomite was chosen as the carrier and was filled in the water purifying reactor. The mixed stock solution of ferrous sulfate (4 g/L of $FeSO_4.7H_2O$) and manganese chloride (10 g/L $MnCl_2.4H_2O$), and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and manganese chloride was continuously pumped into the water purifying reactor as shown in FIG. 1 until the layer of carrier was completely immersed; after immersing for 15 minutes, the solution was discharged through the outlet (2). Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 8:100.

Application for Water Purification.

As for the raw water to be treated, the turbidity was 1.2 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 7

Preparation of the FMBO-Based Adsorbent

Diatomite was chosen as the carrier and was filled in the water purifying reactor. The mixed stock solution of ferrous sulfate (4 g/L of $FeSO_4.7H_2O$) and manganese sulfate (10 g/L $MnSO_4.H_2O$), and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and manganese sulfate was continuously pumped into the water purifying reactor as shown in FIG. 1 until the layer of carrier was completely immersed; after immersing for 15 minutes, the solution was discharged through the outlet 2. Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 8:100.

Application for Water Purification.

As for the raw water to be treated, the turbidity was 1.2 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 8

Preparation of the FMBO-Based Adsorbent

Porcelain granule was chosen as the carrier and was filled in the water purifying reactor. The mixed stock solution of ferrous sulfate (8 g/L of $FeSO_4.7H_2O$), manganese chloride (8 g/L $MnCl_2.4H_2O$) and ferric chloride (10 g/L $FeCl_3.6H_2O$), and the stock solution of potassium permanganate (15 g/L of $KMnO_4$) were separately prepared. The pH of potassium permanganate solution was adjusted to in the range from 9 to 11 with sodium hydroxide solution. The solution of ferrous sulfate, manganese chloride and ferric chloride was continuously pumped into the water purifying reactor as shown in FIG. 1 until the layer of carrier was completely immersed; after immersing for 60 minutes, the solution was discharged through the outlet 2. Then, the permanganate solution into which sodium hydroxide solution has been added was continuously pumped into the water purifying reactor until the complete immersion of the carrier; after immersing for 60 minutes, the residual solution was discharged from the reactor. The procedures stated above were repeated for 5 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 4:100.

Application for Water Purification.

As for the raw water to be treated, the turbidity was 5.0 NTU, and the arsenic concentration was 100 μg/L with the ratio by mass of As(III) to As(V) of 3:1. First, the raw water was treated with sand filter and the flowing rate was controlled to be 10 m/h. The turbidity was decreased to 1.5 NTU. Then, the effluent from sand filter was pumped into the water purifying reactor through the inlet 1 and the evenly-distributing equipment 4 as shown in FIG. 1, and the flowing rate was controlled to be 2 m/h. As concentration of the effluent was decreased to be below 10 μg/L. After a 3-day run, the head loss of the filtering layer increased to 1.5 m. At this time, the influent pump was shut down; back flushing pump was turned on for 8 min. Then, the back flushing water was discharged and treatment of the water containing arsenic was continued. As concentration of the effluent was decreased to be below 10 μg/L.

Example 9

Preparation of the FMBO-Based Adsorbent

Quartz sand was chosen as the carrier and was filled in the water purifying reactor. The stock solutions of ferrous sulfate (15 g/L of $FeSO_4 \cdot 7H_2O$) and potassium permanganate (4 g/L of $KMnO_4$) were separately prepared. The pH of potassium permanganate solution was adjusted to in the range from 9 to 11 with sodium hydroxide solution. The solution of ferrous sulfate was continuously pumped into the water purifying reactor as shown in FIG. 1 until the layer of carrier was completely immersed; after immersing for 60 minutes, the solution was discharged through the outlet 2. Then, the permanganate solution into which sodium hydroxide solution has been added was continuously pumped into the water purifying reactor until the complete immersion of the carrier; after immersing for 60 minutes, the residual solution was discharged from the reactor. The procedures stated above were repeated for 5 times at intervals of 20 minutes. Then, the clean water was pumped into and slowly flowed through the water purifying reactor until the concentrations of Fe and Mn were below the MCLs levels of the drinking water standard. At this time, the ratio by mass of FMBO to carrier was 0.2:100.

Application for Water Purification.

As for the raw water to be treated, the turbidity was 1.0 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 1 m/h. As concentration of the effluent was decreased to be below 10 μg/L.

Example 10

Preparation of the FMBO-Based Adsorbent

Manganese sand was chosen as the carrier and was filled in the water purifying reactor. The mixed stock solution of ferrous sulfate (16 g/L of $FeSO_4 \cdot 7H_2O$) and ferric chloride (6 g/L $FeCl_3 \cdot 6H_2O$), and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and ferric chloride was continuously pumped into the water purifying reactor as shown in FIG. 1 until the layer of carrier was completely immersed; after immersing for 60 minutes, the solution was discharged through the outlet 2. Then, the permanganate solution into which sodium hydroxide solution has been added was continuously pumped into the water purifying reactor until the complete immersion of the carrier; after immersing for 60 minutes, the residual solution was discharged from the reactor. The procedures stated above were repeated for 5 times at intervals of 20 minutes. Then, the clean water was pumped into and slowly flowed through the water purifying reactor until the concentrations of Fe and Mn were below the MCLs levels of the drinking water standard. At this time, the ratio by mass of FMBO to carrier was 0.4:100.

Application for Water Purification.

As for the raw water to be treated, the turbidity was 1.0 NTU, and the arsenic concentration was 100 μg/L with the ratio by mass of As(III) to As(V) of 3:1. The raw water was directly pumped into the water purifying reactor through the inlet 1 and the evenly-distributing equipment 4 as shown in FIG. 1, and the flowing rate was controlled to be 1 m/h. As concentration of the effluent was decreased to be below 10 μg/L.

Example 11

Preparation of the FMBO-Based Adsorbent

Anthracite was chosen as the carrier and was filled in the water purifying reactor. The stock solutions of ferrous sulfate (15 g/L of $FeSO_4 \cdot 7H_2O$) and potassium permanganate (4 g/L of $KMnO_4$) were separately prepared. The pH of potassium permanganate solution was adjusted to in the range from 9 to 11 with sodium hydroxide solution. The solution of ferrous sulfate a was continuously pumped into the water purifying reactor as shown in FIG. 1 until the layer of carrier was completely immersed; after immersing for 15 minutes, the solution was discharged through the outlet (2). Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 6:100.

Application for Water Purification.

As for the raw water to be treated, the turbidity was 1.2 NTU, and the arsenic concentration was 100 μg/L with the ratio of As(III) to As(V) of 3:1 (mass/mass). The raw water was directly pumped into the water purifying reactor through the inlet 1 and the evenly-distributing equipment 4 as shown in FIG. 1, and the flowing rate was controlled to be 1 m/h. As concentration of the effluent was decreased to be below 10 μg/L.

Example 12

Preparation of the FMBO-Based Adsorbent

Magnetite was chosen as the carrier and was filled in the water purifying reactor. The mixed stock solution of ferrous sulfate (12 g/L of $FeSO_4 \cdot 7H_2O$) and manganese sulfate (2.5 g/L $MnSO_4 \cdot H_2O$), and the stock solution of potassium permanganate (4 g/L of $KMnO_4$) were separately prepared. The pH of potassium permanganate solution was adjusted to in the range from 9 to 11 with sodium hydroxide solution. The solution of ferrous sulfate and manganese sulfate was continuously pumped into the water purifying reactor as shown in FIG. 1 until the layer of carrier was completely immersed; after immersing for 15 minutes, the solution was discharged through the outlet 2. Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 2:100.

Application for Water Purification.

As for the raw water to be treated, the turbidity was 1.2 NTU, and the arsenic concentration was 100 μg/L with the ratio by mass of As(III) to As(V) of 3:1. The raw water was directly pumped into the water purifying reactor through the inlet 1 and the evenly-distributing equipment 4 as shown in FIG. 1, and the flowing rate was controlled to be 2 in/h. As concentration of the effluent was decreased to be below 10 μg/L.

Example 13

Preparation of the FMBO-Based Adsorbent

Magnetite was chosen as the carrier and was filled in the water purifying reactor. The mixed stock solution of ferrous sulfate (4 g/L of $FeSO_4 \cdot 7H_2O$) and manganese sulfate (8 g/L $MnSO_4 \cdot H_2O$), and the stock solution of potassium permanganate (6 g/L of $KMnO_4$) were separately prepared. The pH of potassium permanganate solution was adjusted to in the range from 9 to 11 with sodium hydroxide solution. The solution of ferrous sulfate and manganese sulfate was continuously pumped into the water purifying reactor as shown in FIG. 1 until the layer of carrier was completely immersed; after immersing for 15 minutes, the solution was discharged through the outlet 2. Then, the permanganate solution into which sodium hydroxide solution has been added was continuously pumped into the water purifying reactor until the complete immersion of the carrier; after immersing for 20 minutes, the residual solution was discharged from the reactor. The procedures stated above were repeated for 3 times at intervals of 60 minutes. Then, the clean water was pumped into and slowly flowed through the water purifying reactor until the concentrations of Fe and Mn were below the MCLs levels of the drinking water standard. At this time, the ratio by mass of FMBO to carrier was 2:100.

Application for Water Purification.

As for the raw water to be treated, the turbidity was 1.2 NTU, and the arsenic concentration was 100 μg/L with the ratio by mass of As(III) to As(V) of 3:1. The raw water was directly pumped into the water purifying reactor through the inlet 1 and the evenly-distributing equipment 4 as shown in FIG. 1, and the flowing rate was controlled to be 2 m/h. As concentration of the effluent was decreased to be below 10 μg/L.

Example 14

This example is aiming at regenerating the used adsorbent. The FMBO-loaded diatomite adsorbent was filled in the water purifying reactor for arsenic removal. After running for 15 days, the arsenic concentration in effluent was over 10 μg/L and the adsorbent needed to be regenerated. The regeneration procedure was as follows: The stock solutions of ferrous sulfate (15 g/L of $FeSO_4 \cdot 7H_2O$) and potassium permanganate (4 g/L of $KMnO_4$) were separately prepared. The pH of potassium permanganate solution was adjusted to in the range from 9 to 11 with sodium hydroxide solution. The solution of ferrous sulfate was continuously pumped into the water purifying reactor as shown in FIG. 1 until the layer of FMBO-loaded diatomite was completely immersed; after immersing for 20 minutes, the solution was discharged through the outlet 2. Then, the permanganate solution into which sodium hydroxide solution has been added was continuously pumped into the water purifying reactor until the complete immersion of the FMBO-loaded diatomite layer; after immersing for 20 minutes, the residual solution was discharged from the reactor. The procedures stated above were repeated for 3 times at intervals of 30 minutes. Then, the clean water was pumped into and slowly flowed through the water purifying reactor until the concentrations of Fe and Mn were below the MCLs levels of the drinking water standard. At this time, the ratio by mass of FMBO to carrier was 15:100.

What is claimed is:

1. A method for the preparation of a ferric and manganese binary oxide based adsorbent comprising a ferric and manganese binary oxide and a carrier, wherein the ratio by mass of the ferric and manganese binary oxide to the carrier is in the range of (0.2-15):100, the method comprising the following steps:
   (1) separately preparing a solution of a ferrous (Fe(II)) salt and a solution of a permanganate salt; and
   (2) mixing the solution of the ferrous salt prepared in step (1) with the carrier, and then adding the solution of the permanganate salt; or, mixing the solution of the permanganate salt prepared in step 1 with the carrier, and then adding the solution of the ferrous salt, wherein the mol ratio of ferric to manganese in the mixture is (1-5): (5-1).

2. The method as claimed in claim 1, wherein the solution of the ferrous salt may further include one or more of ferric (Fe(III)) salt, and manganese (Mn(II)) salt at any ratio by mass.

3. The method as claimed in claim 1, wherein the solution of the permanganate salt may further include ferric (Fe(III)) salt.

4. The method as claimed in claim 2, wherein the manganese (Mn(II)) salt includes one or more of manganese chloride ($MnCl_2$), and manganese sulfate ($MnSO_4$) at any ratio by mass.

5. The method as claimed in claim 1, wherein said carrier is selected from diatomite, quartz sand, porcelain granule, manganese sand, anthracite, and magnetite.

* * * * *